(No Model.)
A. WESTLING.
PLOW.
No. 338,897. Patented Mar. 30, 1886.
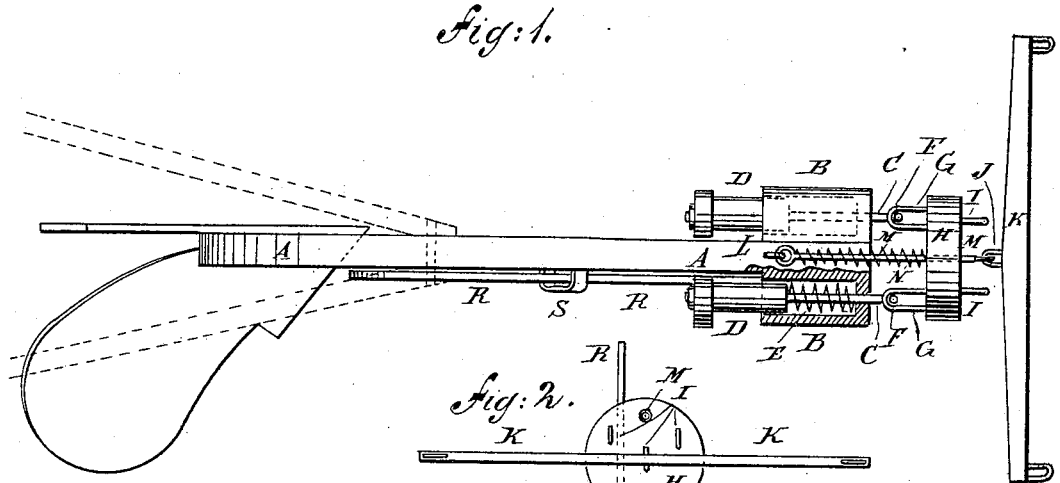
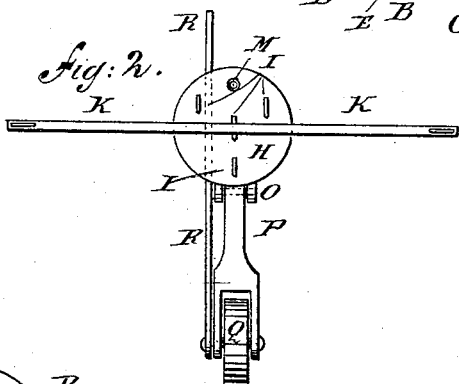
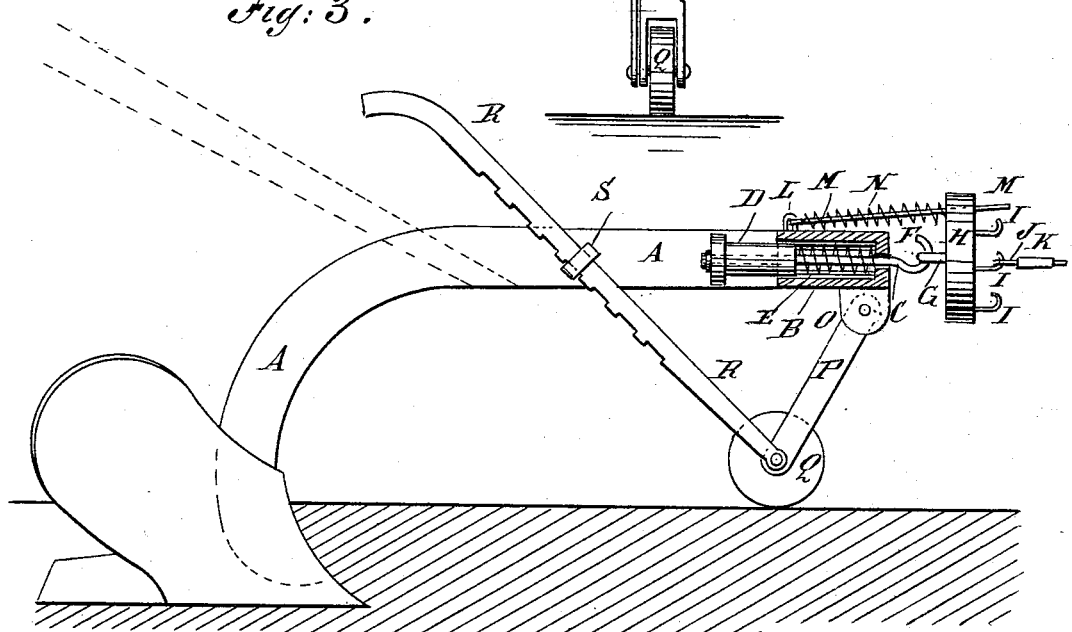
WITNESSES:
Chas. Nida
C. Sedgwick
INVENTOR:
A. Westling
BY Munn & Co
ATTORNEYS.

UNITED STATES PATENT OFFICE.

ADOLPH WESTLING, OF ORTONVILLE, MINNESOTA.

PLOW.

SPECIFICATION forming part of Letters Patent No. 338,897, dated March 30, 1886.

Application filed December 23, 1885. Serial No. 186,544. (No model.)

*To all whom it may concern:*

Be it known that I, ADOLPH WESTLING, of Ortonville, in the county of Big Stone and State of Minnesota, have invented a new and useful Improvement in Plows, of which the following is a full, clear, and exact description.

Reference is to be had to the accompanying drawings, forming a part of this specification, in which similar letters of reference indicate corresponding parts in all the figures.

Figure 1 is a plan view of one of my improved plows, partly in section, and showing in dotted lines the position of the handles. Fig. 2 is a front elevation of the same, the handles being omitted. Fig. 3 is a side elevation of the same, partly in section, and showing in dotted lines the position of the handles.

The object of this invention is to provide plows constructed in such a manner that they will prevent the horses' shoulders from being injured should the said plows strike an obstruction, and that they can be readily adjusted to enter the ground to any desired depth.

The invention consists in the construction and combination of various parts of the plow, as will be hereinafter fully described, and specifically pointed out in the claims.

A represents the beam of an ordinary plow. To the opposite sides of the forward end of the beam A are secured two cylinders, B, open at their rear ends and perforated at their forward ends for the passage of rods C, which have heads or plungers D, formed upon or attached to their rear ends. Upon the rods C, within the cylinders B, are placed spiral springs E, the forward ends of which rest against the inner surfaces of the forward ends of the cylinders B, and against their rear ends rest the heads D of the rods C.

The forward ends of the rods C have hooks F formed upon them to engage with staples or eyes G, attached to the rear side of the draft-plate H, or are otherwise connected with the said draft-plate. To the forward side of the draft-plate H are attached hooks I, to receive the staple J of the double-tree K, so that by connecting the said double-tree with one or another of the hooks I the plow may be made to run deep or shallow or to take or leave land, as may be required.

To the upper side of the plow-beam A, near its forward end, is attached a staple, L, into which is hooked a hook formed upon the rear end of the rod M. The forward end of the rod M passes through a guide-hole in the upper part of the draft-plate H. Upon the rod M is placed a spiral spring, N, the forward end of which rests against the rear side of the upper part of the draft-plate H, and its rear end is connected with the staple L. With this construction, when the draft is applied to the lower hook I, the spring N holds the upper part of the draft-plate H from tilting to the rearward.

The springs E are made of sufficient strength to resist the draft-strain under ordinary circumstances; but should the plow strike an obstruction the said springs will yield, and thus prevent the horses' shoulders from being injured by the sudden jar.

Upon the lower side of the forward end of the plow-beam A are formed, or to it are attached, two lugs, O, to and between which is pivoted the upper end of a standard, P. The lower end of the standard P is forked, and to it is journaled the gage-wheel Q. To the lower end of the pivoted standard P is pivoted the lower end of a bar, R, having teeth upon its lower edge to engage with a keeper, S, attached to the side of the plow-beam A, and through which the said bar R passes. The rear end of the bar R extends back into such a position that it can be readily reached and operated by the plowman to adjust the gage-wheel as may be desired.

Having thus fully described my invention, I claim as new and desire to secure by Letters Patent—

1. A plow-clevis consisting of the cylinders B B, plungers D, rods C, hooked at F, spiral springs E, the draft-plate H, having staples G on its rear face engaging the hooks F, and the several hooks, I, projecting from different parts of the front face of said draft-plate, substantially as set forth.

2. The combination, with the plow-beam A and the draft-plate H, connected with the said plow-beam by the rods C, springs E, and cylinders B, and provided with the hooks I, to receive the draft, of the rod M and the spiral spring N, substantially as herein shown and described, whereby the said draft-plate is kept from tilting back when the draft is applied to the lower part of the said draft-plate, as set forth.

3. The combination, with the plow-beam A, the cylinders B, rigidly secured to the forward end thereof, spring-pressed plungers within said cylinders, and a draft-plate connected with said plungers, of a guide-rod extending in front of the plow-beam and connecting it with draft-plate, substantially as set forth.

ADOLPH WESTLING.

Witnesses:
A. J. PARKER,
J. WM. BROWN.